(12) United States Patent
Fu et al.

(10) Patent No.: US 10,984,464 B2
(45) Date of Patent: Apr. 20, 2021

(54) APPARATUS AND METHODS FOR CONTAINER DETERMINATION

(71) Applicant: Walmart Apollo, LLC, Bentonville, AR (US)

(72) Inventors: Mingang Fu, Palo Alto, CA (US); Madhavan Kandhadai Vasantham, Dublin, CA (US); Bipin Mulik, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 192 days.

(21) Appl. No.: 16/181,297

(22) Filed: Nov. 5, 2018

(65) Prior Publication Data

US 2020/0143450 A1 May 7, 2020

(51) Int. Cl.
  *G06Q 30/06* (2012.01)
  *G06Q 10/08* (2012.01)
  *G06N 7/00* (2006.01)

(52) U.S. Cl.
  CPC ......... *G06Q 30/0635* (2013.01); *G06N 7/005* (2013.01); *G06Q 10/083* (2013.01)

(58) Field of Classification Search
  None
  See application file for complete search history.

(56) References Cited

U.S. PATENT DOCUMENTS

| | | | | |
|---|---|---|---|---|
| 5,640,002 A | * | 6/1997 | Ruppert | G06K 7/0008 235/462.46 |
| 8,326,679 B1 | * | 12/2012 | Rowe | G06Q 10/08 705/7.38 |
| 8,407,096 B2 | * | 3/2013 | Mathe | G06Q 30/0635 705/22 |

(Continued)

FOREIGN PATENT DOCUMENTS

| | | | | |
|---|---|---|---|---|
| JP | 2016157447 A | * | 9/2016 | B65B 59/00 |
| WO | WO-9639674 A1 | * | 12/1996 | G06Q 10/06315 |

OTHER PUBLICATIONS

Sherrard, W.R., et al., "Activity-Based Costing: Multiple Lot Size Effect," Journal of Applied Business Research, vol. 13, No. 2, pp. 103-108, Spring 1997. (Year: 1997).*

*Primary Examiner* — Nicholas D Rosen
(74) *Attorney, Agent, or Firm* — Duane Morris LLP; Manita Rawat

(57) ABSTRACT

A container determination system is provided and generally includes a server, a database, and a customer computing device. The server may obtain, from the database, purchase order data identifying order lines of a purchase order, where each order line is associated with one or more items. The server may associate each order line of the purchase order with an initial container. The server may then optimize the assortment of items amongst the initial containers by attempting to re-associate a selected order line with another container based on whether the other container can hold the items associated with the selected order line, and based on (Continued)

a comparison between an acceptance rate and a randomly selected rate. The re-associations are attempted multiple times to determine optimized assortment information, which may be transmitted to an associate device to have a bagger place the purchased items in containers according to the optimized assortment information.

20 Claims, 6 Drawing Sheets

(56) References Cited

U.S. PATENT DOCUMENTS

| | | | | |
|---|---|---|---|---|
| 8,504,413 | B1* | 8/2013 | Rowe | G06Q 10/08 |
| | | | | 705/7.38 |
| 8,924,007 | B2* | 12/2014 | Arunapuram | G06Q 10/083 |
| | | | | 700/229 |
| 10,118,723 | B2* | 11/2018 | Clark | B65B 59/02 |
| 10,614,395 | B2* | 4/2020 | Naumann | G06Q 10/06 |
| 2005/0177440 | A1* | 8/2005 | Mathe | G06Q 30/0635 |
| | | | | 705/26.81 |
| 2010/0223186 | A1* | 9/2010 | Hogan | G07F 7/08 |
| | | | | 705/71 |
| 2012/0158385 | A1* | 6/2012 | Arunapuram | G06Q 10/083 |
| | | | | 703/6 |
| 2013/0247519 | A1* | 9/2013 | Clark | B65B 57/00 |
| | | | | 53/452 |
| 2014/0172736 | A1* | 6/2014 | Saha | G06Q 10/083 |
| | | | | 705/330 |
| 2017/0206480 | A1* | 7/2017 | Naumann | G06Q 10/06315 |
| 2019/0378232 | A1* | 12/2019 | Goren | G06Q 10/04 |

\* cited by examiner

APPARATUS AND METHODS FOR CONTAINER DETERMINATION

TECHNICAL FIELD

This application relates generally to product bagging and, more particularly, to bag determination and resource optimization for purchased goods.

BACKGROUND

At least some known systems and industries provide bags for holding and storing purchased goods. For example, at least some grocery stores provide bags, such as plastic or paper bags, for holding and storing purchased grocery items. When a customer buys goods at such a grocery store, the purchased goods are placed within bags. In addition, some online retailers allow customers to purchase goods online (e.g., via a retailer's website). The retailers may offer a customer an option to have the purchased goods delivered to an address, such as a home address, or to have the purchased goods available for pickup, such as at a retailer's location (e.g., grocery store). In some cases, a customer may have the option to have the purchased goods placed in bags for shipment or pickup. Typically, a grocery bagger bags the purchased grocery items, whether purchased in a store or online, for a customer. Grocery baggers, however, may not fully optimize the available bag space, and end up using more bags than necessary.

Moreover, some retailers, to recover the cost of bags, charge a fee to the customer for a number of bags that may be used. For example, a retailer may estimate the number of bags needed for an online order, and may charge the customer a fee for each of the estimated number of bags. A retailer may estimate the number of bags needed based on how many order lines an order contains. For example, if an order includes ten apples, five bananas, and three pineapples, the order would include three order lines—one for the apples, one for the bananas, and one for the pineapples. A retailer may estimate the number of bags to be three. The estimated number of bags, however, may not be accurate, as the actual number of bags used to hold and store the purchased goods may be different from (e.g., more or less than) the estimated number of bags. For some retailers charging a bag fee to the customer, the retailer may charge the customer for additional bags if more bags than that estimated were actually used to store the purchased goods, or may need to refund the customer if less bags than estimated were required. The need to have to adjust the cost charged is at least inconvenient to both the retailer and the customer. As such, there are opportunities to address deficiencies with bag determination decisions for holding and storing purchased goods.

SUMMARY OF THE INVENTION

The embodiments described herein allow for a more accurate estimation of the number of containers needed to store and hold purchased goods. A container may be a bag, such as a plastic or paper bag, or any other suitable containing unit. For convenience, however, the term "bag" will be used herein. In addition, the embodiments may provide an identification of a distribution of the purchased goods among bags.

For example, in some embodiments, an apparatus includes a communications interface or unit, such as a transceiver, coupled to a computing device. It should be noted that, as used herein, the terms "couple" and "coupled" are not limited to a direct mechanical, communication, and/or an electrical connection between components, but may also include an indirect mechanical, communication, and/or electrical connection between two or more components or a coupling that is operative through intermediate elements or spaces.

The computing device may be configured to obtain, via the communications interface, purchase order data identifying a plurality of order lines of a purchase order, where each order line is associated with at least one item. The computing device may also be configured to determine assortment data that associates each order line of the plurality of order lines with a corresponding initial bag of a plurality of bags. The computing device may be configured to execute one or more bag determination iterations, where each bag determination iteration includes selecting a first order line of the plurality of order lines, where the first order line is associated with at least a first item, and selecting a first bag of the plurality of bags. The order line and bag may each be selected randomly, for example. Each bag determination iteration may also include determining whether the first bag can store the first item(s) associated with the first order line, and determining whether the corresponding initial bag associated with the first order line is not associated with any other order line of the plurality of order lines. The computing device may also be configured to re-associate the first order line with the first bag if it is determined that the first bag can store the first item(s), and that the corresponding initial bag associated with the first order line is not associated with any other order line of the plurality of order lines. The computing device may also be configured to transmit, via the communications interface, the assortment data to a device.

In some embodiments, a method, by a computing device, includes obtaining purchase order data identifying a plurality of order lines of a purchase order, where each order line is associated with at least one item, and determining assortment data that associates each order line of the plurality of order lines with a corresponding initial bag of a plurality of bags. The method may also include executing at least a first bag determination iteration of a plurality of bag determination iterations. The first bag determination iteration may include selecting a first order line of the plurality of order lines, where the first order line is associated with at least a first item, and selecting a first bag of the plurality of bags. The first bag determination iteration may also include determining whether the first bag of the plurality of bags can store the at least first item associated with the first order line of the plurality of order lines, and determining whether the corresponding initial bag associated with the first order line is not associated with any other order line of the plurality of order lines.

The method may further include re-associating the first order line of the plurality of order lines with the first bag if it is determined that the first bag can store the at least first item, and that the corresponding initial bag associated with the first order line of the plurality of order lines is not associated with any other order line of the plurality of order lines. The method may also include transmitting the assortment data to a device.

In yet other embodiments, a non-transitory computer readable medium has instructions stored thereon where the instructions, when executed by at least one processor, cause a device to perform operations that include obtaining purchase order data identifying a plurality of order lines of a purchase order, where each order line is associated with at least one item, and determining assortment data that associates each order line of the plurality of order lines with a corresponding initial bag of a plurality of bags. The operations may also include executing at least a first bag determination iteration of a plurality of bag determination iterations. The first bag determination iteration may include selecting a first order line of the plurality of order lines, where the first order line is associated with at least a first item, and selecting a first bag of the plurality of bags. The first bag determination iteration may also include determining whether the first bag of the plurality of bags can store the at least first item associated with the first order line of the plurality of order lines, and determining whether the corresponding initial bag associated with the first order line is not associated with any other order line of the plurality of order lines.

The operations may further include re-associating the first order line of the plurality of order lines with the first bag if it is determined that the first bag can store the at least first item, and that the corresponding initial bag associated with the first order line of the plurality of order lines is not associated with any other order line of the plurality of order lines. The operations may also include transmitting the assortment data to a device.

Among other advantages, the embodiments may allow retailers to minimize the number of bags needed for purchased goods, thereby reducing their bag costs. For example, the embodiments may allow a retailer to more accurately estimate the number of bags that will be needed to hold and store purchased goods. In addition, the embodiments may allow retailers to more accurately determine a bag cost associated with an order, such as a bag cost charged to the purchasing customer. Moreover, the embodiments may allow retailers to reduce the time it takes a bagger to place purchased goods in bags by identifying for the bagger a distribution of the purchased goods among bags (e.g., how the purchased goods should be distributed among one or more bags). Those of ordinary skill in the art may recognize other advantages as well.

DETAILED DESCRIPTION

Figure 1:
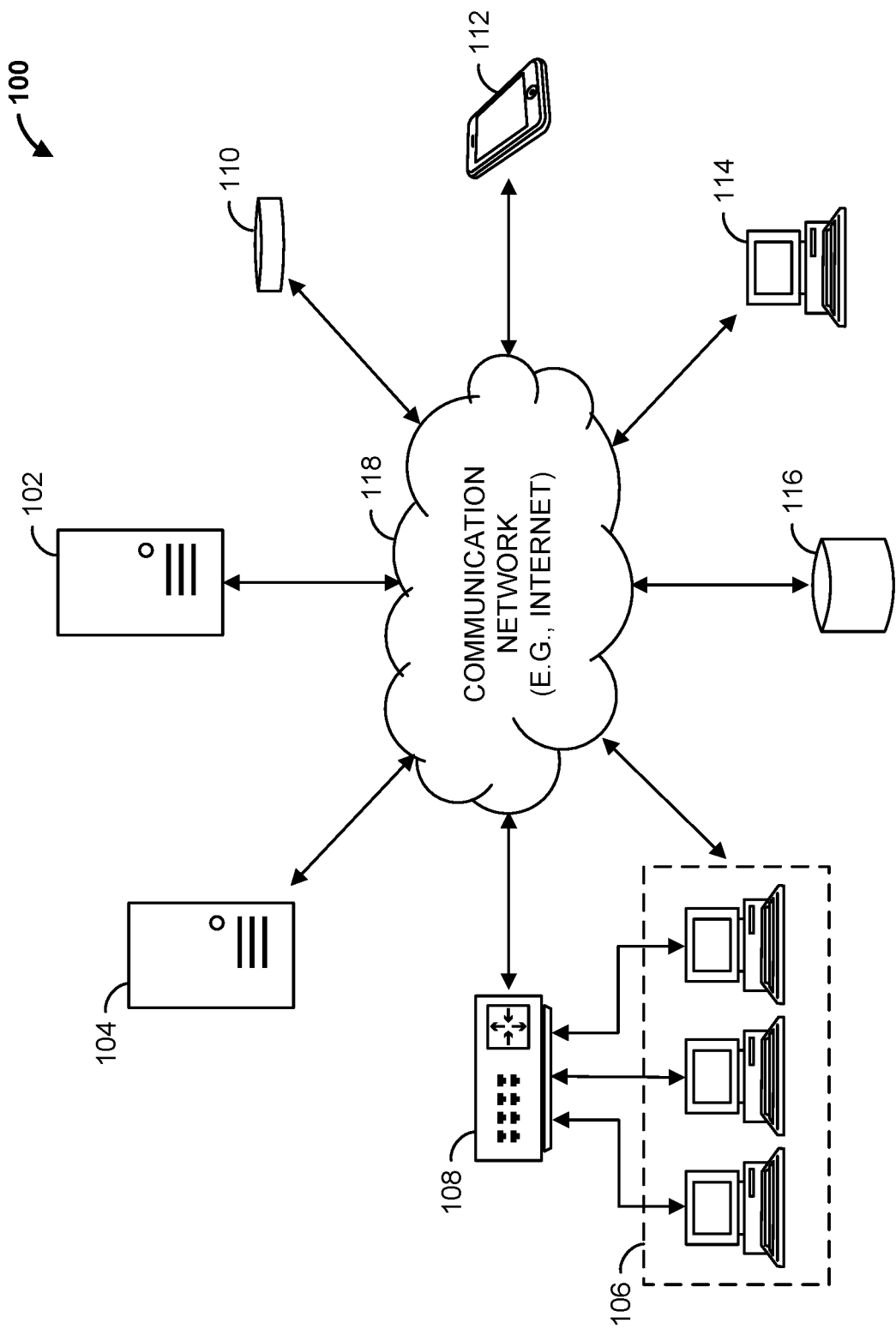
FIG. 1 illustrates an exemplary bag determination system in accordance with some embodiments of the present disclosure.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled." "operatively coupled," "operatively connected." and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings. FIG. 1 illustrates a block diagram of an e-commerce bag determination system 100 that includes a bag determination computing device 102 (e.g., a server, such as an application server), a web hosting device (e.g., a web server) 104, associate computing device(s) 106, database 116, and multiple customer computing devices 110, 112, 114 operatively coupled over network 118. Bag determination computing device 102, web hosting device 104, associate computing device(s) 106, and multiple customer computing devices 110, 112, 114 can each be any suitable computing device that may include any hardware or hardware and software combination that allows for the processing of data. For example, each can include one or more processors, one or more field-programmable gate arrays (FPGAs), one or more application-specific integrated circuits (ASICs), one or more state machines, digital circuitry, or any other suitable circuitry.

In some embodiments, bag determination computing device 102 and associate computing device(s) 106 can each be a computer, a workstation, a laptop, a server such as a cloud-based server, or any other suitable computing device. In some embodiments, each of multiple customer computing devices 110, 112, 114 can be a computer, a laptop, a voice assistant device, a digital assistant, a mobile device such as a cellular phone, or any other suitable computing device.

Although FIG. 1 illustrates three customer computing devices 110, 112, 114, bag determination system 100 can include any number of customer computing devices 110, 112, 114. Similarly, bag determination system 100 can include any number of workstation(s) 106, bag determination computing devices 102, web servers 104, and databases 116.

Additionally, each of bag determination computing device 102, web hosting device 104, associate computing device(s) 106, and multiple customer computing devices 110, 112, 114 can transmit data to, and receive data from, communication network 118. Communication network 118 can be a WiFi® network, a cellular network such as a 3GPP® network, a Bluetooth® network, a satellite network, or any other suitable network. Communication network 118 can provide access to, for example, the Internet.

Associate computing device(s) 106 are operably coupled to communication network 118 via router (or switch) 108. For example, associate computing device(s) 106 can communicate with bag determination computing device 102 over communication network 118 via router 108. Each of bag determination computing device 102, web server 104, and associate computing device(s) 106 may be operated by a retailer. Additionally, each of bag determination computing device 102, web server 104, and associate computing device(s) 106 may store data to, and read data from, database 116. Database 116 can be a remote storage device, such as a cloud-based server, a memory device on another application server, a networked computer, or any other suitable remote storage. Although shown remote to bag determination computing device 102, in some examples database 116 can be a local storage device, such as a hard drive, a non-volatile memory, or a USB stick.

Customer computing devices 110, 112, 114 may be computing devices operated by customers of the retailer. Each customer computing device 110, 112, 114 may communicate with web server 104 over communication network 118. For example, web server 104 may host a website (e.g., webpage) of a retailer where customers can place online orders for goods or services. Customer computing devices 110, 112, 114 may access the website hosted on web server 104 over communication network 118.

Bag determination system 100 may allow for estimating the number of bags needed for an order. For example, a customer may place an online order for goods, such as groceries, on a website hosted by web server 104. The customer may select to pick up the goods at a local retailer location. Web server 104 may request from bag determination computing device 102 an estimation of the number of bags needed to hold the purchased goods. Bag determination computing device 102 may calculate assortment data that includes an estimated number of bags, and data that identifies which products should be placed together in the same bag. Bag determination computing device 102 may then transmit the assortment data to associate computing device(s) 106, which may be located at the local retail location where the customer is picking up the goods.

In some examples, bag determination computing device 102 may obtain purchase order data identifying a plurality of order lines of a purchase order, where each order line is associated with at least one purchased item. Example order lines of a purchase order are described, for example, with respect to FIG. 4 below. Bag determination computing device 102 may determine assortment data that associates each order line of the plurality of order lines with a corresponding initial bag of a plurality of bags. For example, the first order line may be associated with a first bag (e.g., bag 1), the second order line may be associated with a second bag (e.g., bag 2), and so forth. Bag determination computing device 102 may then execute one or more bag determination optimization iterations where each iteration includes selecting a first order line of the plurality of order lines, where the first order line is associated with at least a first item. The optimization iteration may also include selecting a first bag of the plurality of bags.

The optimization iteration may further include determining whether the first bag of the plurality of bags can store the first item(s) associated with the first order line of the plurality of order lines. Additionally, the optimization iteration may include determining whether the corresponding initial bag associated with the first order line of the plurality of order lines is associated with any other order line of the plurality of order lines. If bag determination computing device 102 determines that the first bag of the plurality of bags can store the at least first item, and that the corresponding initial bag associated with the first order line of the plurality of order lines is not associated with any other order line of the plurality of order lines, then bag determination computing device 102 may update the assortment data by re-associating the first order line of the plurality of order lines with the first bag.

Otherwise, if bag determination computing device 102 determines that the first bag of the plurality of bags cannot store the at least first item, or that the corresponding initial bag associated with the first order line of the plurality of order lines is associated with another order line of the plurality of order lines, bag determination computing device 102 may perform operations to determine whether the assortment data should be updated. For example, bag determination computing device may obtain an acceptance probability from a database, which may represent a threshold probability. Bag determination computing device may also determine a random probability, and determine whether the acceptance probability is beyond (e.g., greater than) the random probability. If the acceptance probability is beyond the random probability, then bag determination computing device 102 may update the assortment data by re-associating the first order line of the plurality of order lines with the first bag. Bag determination computing device 102 may transmit the assortment data to an associate device, such as to one or more of associate computing device(s) 106.

Figure 2:
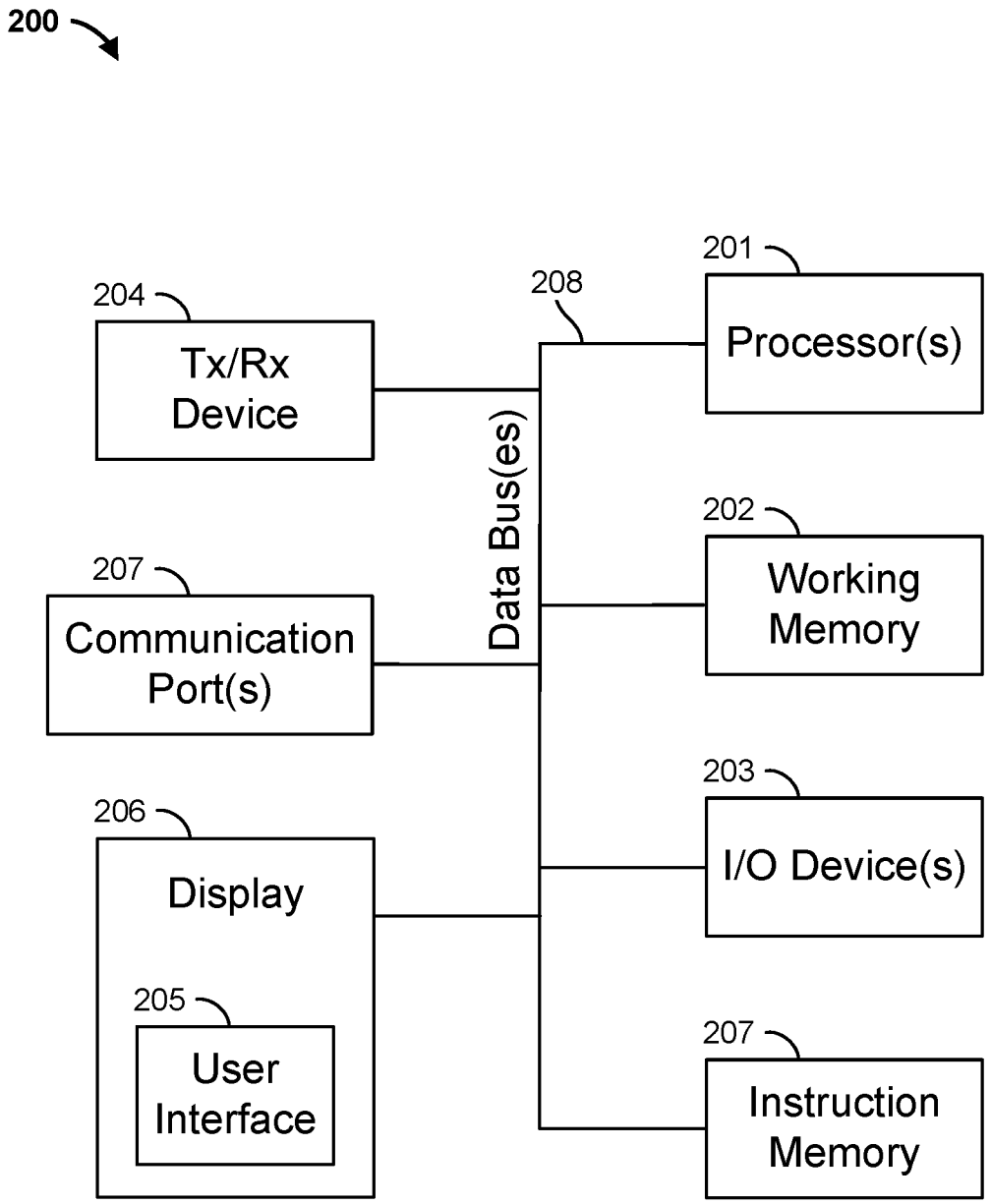
FIG. 2 illustrates a block diagram of the exemplary computing device shown in FIG. 1, in accordance with some embodiments of the present disclosure.

FIG. 2 illustrates a block diagram of the bag determination computing device 102 of FIG. 1 in further detail. Bag determination computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like. Processors 201 can be configured to perform a certain function or operation by executing code, stored on instruction memory 207, embodying the function or operation. For example, processors 201 can be configured to perform one or more of any function, method, or operation disclosed herein.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of voice representation computing device 102. Working memory 202 can be a random access memory (RAM) such as a static random access memory (SRAM) or dynamic random access memory (DRAM), or any other suitable memory.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allow for the transfer (e.g., uploading or downloading) of data, such as assortment data as described herein.

Display 206 can display user interface 205. User interfaces 205 can enable user interaction with bag determination computing device 102. For example, user interface 205 can be a user interface for an application that allows for the viewing of assortment data as described herein. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 voice representation computing device 102 will be operating in. Processor(s) 201 is operable to receive data from, or send data to, a network, such as communication network 118 of FIG. 1, via transceiver 204.

Figure 3:
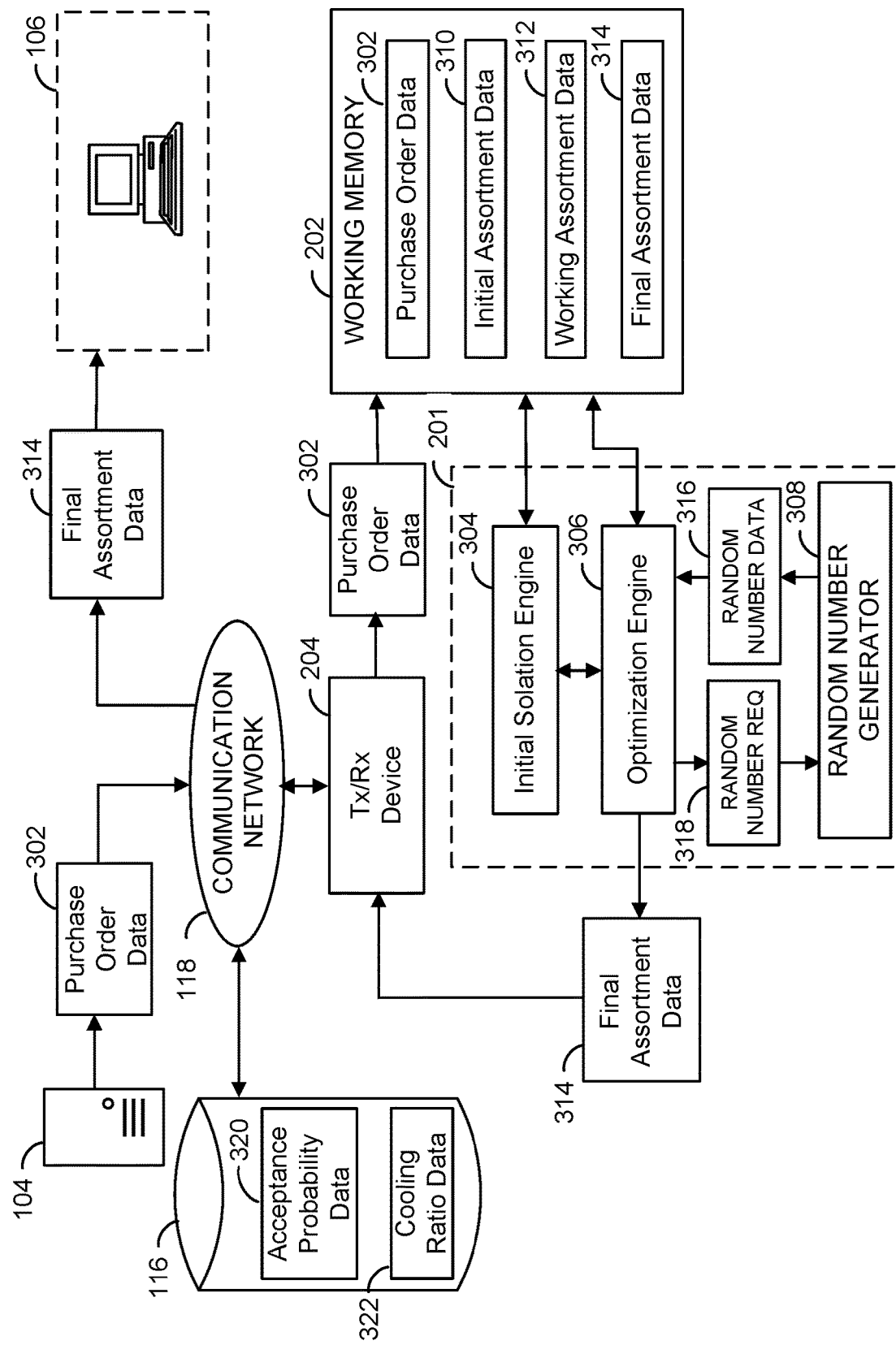
FIG. 3 illustrates a block diagram of various portions of the exemplary computing device shown in FIG. 1, in accordance with some embodiments of the present disclosure.

FIG. 3 is a block diagram illustrating examples of various portions of the bag determination system 100 of FIG. 1. As indicated in the figure, bag determination computing device 102 receives, via transceiver 204 over communication network 118, purchase order data 302 from web server 104. Purchase order data 302 may include one or more order lines for a purchase order, where each order line is associated with at least one item. Transceiver 204 may store purchase order data 302 in a local data repository, such as in working memory 202.

Each of initial solution engine 304, optimization engine 306, and random number generator 308 may be implemented in hardware, or may be implemented in hardware and software. For example, in some embodiments, each of initial solution engine 304, optimization engine 306, and random number generator 308 may include software that is executed by one or more processor(s) 201 to carry out one or more functions as described herein.

Initial solution engine 304 may obtain, from working memory 202, purchase order data 302 to determine initial assortment data 310, which associates each order line identified by purchase order data 302 with an initial digital representation of a bag. For example, the digital representation of bags may be a vector "bag[NUMBER_OF_BAGS]" where the first element (i.e., bag[0]) represents a first bag, the second element (i.e., bag[1]) represents a second bag, and so forth. The first order line may be associated with the first element of the bag vector, the second order line may be associated with the second element of the bag vector, and so forth until all of the order lines have been associated with an initial digital representation of a bag. As indicated in the figure, initial solution engine 304 may store the initial assortment data 310 in a local repository, such as working memory 202.

Optimization engine 306 is operable execute a plurality of bag optimization determination iterations to generate final assortment data 314 that identifies an optimized assortment of the items associated with the purchase order among the one or more bags. Optimization engine 306 selects an order line of the plurality of order lines identified by initial assortment data 310. In some examples, optimization engine 306 selects the order line randomly. Optimization engine 306 also selects a bag identified by initial assortment data 310. In some examples, the bag is randomly selected. For example, the randomly selected bag may be a bag that is associated with another order line. In some examples, optimization engine 306 may select one or more of the order line and the bag based on a deterministic or stochastic model (not shown).

Optimization engine 306 may then determine whether the selected bag can store the item(s) associated with the selected order line based on one or more constraints (e.g., rules). For example, optimization engine 306 may determine a bag volume of the selected bag, and a volume of the item(s) associated with the selected order line. Optimization engine 306 may also determine the volume of any item(s) associated with order lines currently associated with (e.g., assigned to) the selected bag. For example, the volume of the bags to be used to store the items may be pre-determined and stored in database 116. Similarly, the volumes of items that may be purchased may also be pre-determined and stored in database 116. Optimization engine 306 may obtain the bag volume and item volumes for items associated with the selected order line, as well as for items associated with order lines currently assigned to the selected bag, from database 116 via a request to database 116 over communication network 118. Optimization engine 306 may determine that the bag cannot store the item(s) if the total item volume is greater than the bag volume. For example, optimization engine 306 may add up the item volumes to determine a total item volume, and compare the total item volume to the bag volume to determine if the total item volume is greater than the bag volume. If the total item volume is greater than the bag volume, then optimization engine 306 determines that the bag cannot hold the items. If, however, the total item volume is less than the bag volume, then optimization engine 306 determines that the bag can hold the items.

In some examples, optimization engine 306 may determine whether the selected bag can store the item(s) associated with the selected order line based on the holding weight of the selected bag. For example, optimization engine 306 may obtain a holding weight of the selected bag, the weight of items currently associated with the selected bag, and the weight of the items associated with the selected order line, from, for example, database 116. Optimization engine 306 may then determine whether a total item weight, including the weight of the items currently associated with the selected bag, and the weight of the items associated with the selected order line, is greater than the holding weight of the selected bag. If the total item weight is greater than the holding weight of the selected bag, optimization engine 306 may determine that the selected bag cannot hold the items associated with the selected order line. If, however, the total item weight is less than or equal to the holding weight of the selected bag, optimization engine 306 may determine that the selected bag can hold the items associated with the selected order line.

In some examples, optimization engine 306 may determine that the items associated with the selected order line cannot be placed in the selected bag because raw food cannot be placed in the same bag with ready to eat food. For example, if the selected bag is currently associated with an order line that is associated with food items that are raw, and the selected order line is associated with food items that are ready to eat, optimization engine 306 may determine that the selected bag cannot hold the items associated with the selected order line.

Other constraints that optimization engine 306 may implement include not placing meat and produce in the same bag, not placing hot food items with cold food items, not placing chemicals with food items, and placing fragile items, such as egg cartons, in its own bag. Other constraints are also contemplated.

In some examples, if optimization engine 306 determines that the items associated with the selected order line may not be placed in the selected bag, optimization engine 306 may associate at least a first portion of the selected order line with the selected bag, and a second portion of the selected order line with another bag. For example, optimization engine 306 may determine that not all of the items associated with the selected order line may be placed in the selected bag because the volume of the bag is not large enough to hold all of the items. Optimization engine 306 may then determine that the bag is large enough to hold a portion of the items, and thus may associate the portion of the selected order line with the selected bag. The remaining portion may be associated with another bag, such as one that is randomly selected.

In some examples, a user is able to configure optimization engine 306 to implement one or more of the above noted restraints. For example, a user may configure optimization engine 306 by providing an input via input/output device 203 to enable or disable one or more of the above noted constraints.

If optimization engine 306 determines that the items, or a portion thereof, associated with the selected order line may be placed in the selected bag, optimization engine 306 may re-associate the selected order line, or a portion, to the selected bag. For example, optimization engine 306 may generate working assortment data 312 that associates the selected order line with the selected bag. Optimization engine 306 may update working assortment data 312 as it executes the plurality of bag optimization determination iterations as described herein. For example, optimization engine 306 may first generate working assortment data 312 to be a copy of initial assortment data 310. As optimization engine 306 executes each bag optimization iteration, optimization engine 306 may update working assortment data 312 to reflect new selected order line to selected bag associations. The number of the plurality of bag optimization iterations may be preconfigured. For example, a user may provide an input via input/output device 203 to configure a maximum number of bag determination optimization iterations.

In some examples, after each bag optimization iteration, optimization engine 306 removes any bags not associated with any order lines. For example, optimization engine 306 may re-associate a selected order line from an initial bag to a selected bag. If the initial bag is now not associated with any order lines, optimization engine 306 may remove the bag such that it will not be selected in a future bag optimization iteration. As such, the number of available bags will be reduced.

In some examples, if optimization engine 306 determines either that the selected bag cannot store the items associated with the selected order line, or that a current bag associated with the selected order line is associated with any other order line, optimization engine 306 may decide whether to re-associate the selected order line with the selected bag based on a comparison between a random probability and an acceptance probability. For example, optimization engine 316 may obtain, from database 116, a predetermined acceptance probability data 320 that identifies a probability (e.g., a percentage value). Optimization engine 316 may also obtain random number data 316 from random number generator 308 in response to a random number request 318. The random number data 316 identifies a random number, such as a number between 0 and 1, inclusive. Optimization engine 306 may process random number data 316 to determine a random probability. For example, if random number generator 308 generates random numbers between 0 and 10, inclusive, optimization engine 306 may divide the random number identified by the random number data 316 by ten to determine a random probability. Optimization engine 306 may then determine whether the acceptance probability is beyond (e.g., greater than) the random probability. If the acceptance probability is beyond the random probability, optimization engine 306 may update the working assortment data 312 by re-associating the selected order line with the selected bag. Otherwise, if the acceptance probability is not beyond the random probability, the working assortment data 312 is not updated.

In some examples, after a maximum number of bag determination optimization iterations (which may be configured by a user, as described above), optimization engine 306 may adjust the acceptance probability by a cooling ratio. For example, optimization engine 306 may reduce the acceptance probability by multiplying the current acceptance probability by the cooling ratio to generate an updated acceptance probability. The cooling ratio may be predetermined and stored in database 116. For example, optimization engine 306 may obtain cooling ratio data 322, identifying the cooling ratio, from database 116. The updated acceptance probability may be used in a future bag determination optimization iteration. For example, after executing the maximum number of bag determination optimization iterations with the current acceptance probability, optimization engine 306 may update the acceptance probability based on the cooling ratio as described herein, and execute another maximum number of bag determination optimization iterations with the updated acceptance probability. Optimization engine 306 may continue executing a maximum number of bag determination optimization iterations, followed by updating the acceptance probability with the cooling ratio, for a maximum number of times. The maximum number of times may be determined, for example, based on how long the execution takes. For example, the process may be executed for any number of times that results in completion under 100 mill-seconds.

Upon completion, optimization engine 306 generates final assortment data 314 based on working assortment data 312, which associates each order line identified by purchase order data 302 with a final digital representation of a bag. In some examples, final assortment data 314 also includes data identifying a total number of bags required for the purchase order. The total number of bags required may be the total number of bags associated with at least a portion of an order line.

In some examples, optimization engine 306 further generates a purchase order bag cost for the purchase order based on the total number of bags, and includes it in the final assortment data 314. For example, optimization engine 306 may determine the purchase order bag cost based on a preconfigured cost for one bag and the total number of bags required for the purchase order (e.g., optimization engine 306 may multiply the preconfigured per bag cost with the total number of bags required). The purchase order bag cost may be charged, for example, to the customer for a retailer to recover at least a portion of the cost of the bags required for the purchase order.

Optimization engine 306 may transmit the final assortment data 314, via transceiver 204 over communications network 118, to associate computing device 106. Upon receiving the final assortment data 314, a bagger, for example, may bag the purchase order accordingly.

FIGS. 4A, 4B, 4C, and 4D illustrate diagrams of example purchase order line to bag assignments for a purchase order that can be implemented by, for example, the bag determination computing device 102 of FIG. 1. The figures illustrate a data identifying a purchase order 402 that includes associated purchase order lines, each purchase order line identifying at least one item. For example, the first purchase order line identifies "3 Apples," the second purchase order line identifies "5 Bananas," the sixth purchase order line identifies "2 cartons of eggs." and the last purchase order line identifies "6 carrots." The data identifying the purchase order 402 may be an example of purchase order data 302, for example, as described above with respect to FIG. 3. The figures also illustrate a digital representation of bags 404, which includes seven bags in this example, identified as "Bag 1" through "Bag 7." The digital representation of bags 404 may be implemented as a bag vector as described above with respect to FIG. 3.

Figure 4A:
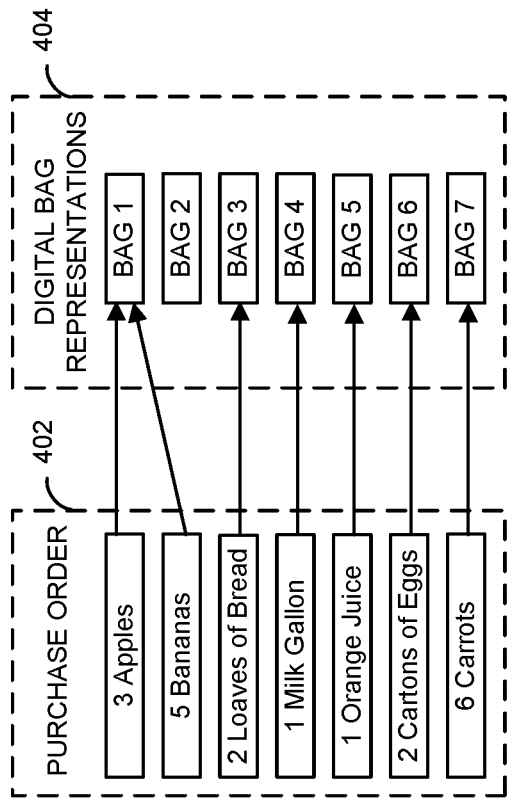
FIGS. 4A, 4B, 4C, and 4D are diagrams of example purchase order line to bag assignments for a purchase order that can be implemented by the exemplary computing device shown in FIG. 1, in accordance with some embodiments.

FIG. 4A identifies an example of initial assortment data 310 that may be generated by, for example, the initial solution engine 304 of FIG. 3. In this example, the first purchase order line, which identifies "3 Apples," is associated with the first bag, identified as "Bag 1." Additionally, the second purchase order line, which identifies "5 Bananas," is associated with the second bag, identified as "Bag 2." The second purchase order line, which identifies "5 Bananas," is associated with the second bag, identified as "Bag 2." The third purchase order line, which identifies "2 Loaves of Bread," is associated with the third bag, identified as "Bag 3." The fourth purchase order line, which identifies "1 Milk Gallon," is associated with the fourth bag, identified as "Bag 4." The fifth purchase order line, which identifies "1 Orange Juice." is associated with the fifth bag, identified as "Bag 5." The sixth purchase order line, which identifies "2 Cartons of Eggs," is associated with the sixth bag, identified as "Bag 6," and the seventh and last purchase order line, which identifies "6 Carrots." is associated with the seventh and last bag, identified as "Bag 7."

Figure 4B:
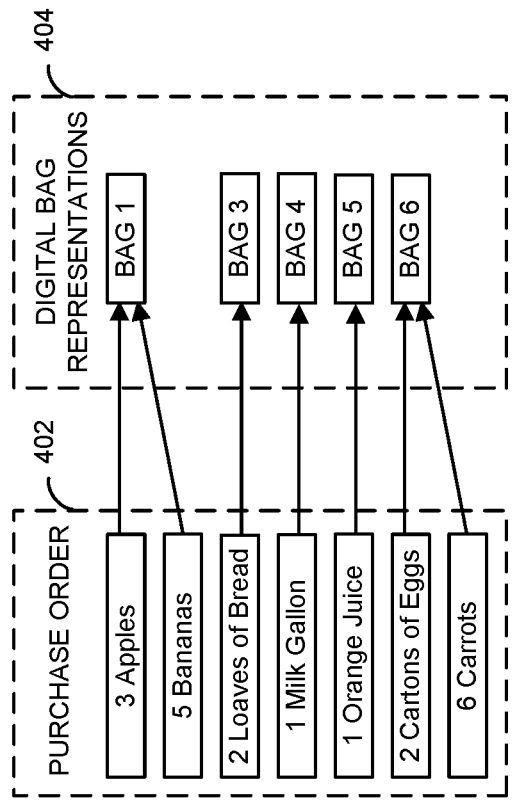

FIG. 4B identifies an example of working assortment data 312, which may be generated by the optimization engine 306 of FIG. 3 executing one or more bag determination optimization iterations. FIG. 4B illustrates that the second order line, identifying "5 Bananas," has been re-associated, and is now associated with the first bag, "Bag 1." For example, optimization engine 306 may randomly select an order line of purchase order 402, such as the second order line, in this example. Optimization engine 306 may also randomly select a bag from the digital representation of bags 404, such as the first bag. "Bag 1," in this example. Optimization engine 306 may determine that "Bag 1" can hold, in addition to "3 Apples" (which are currently assigned to "Bag 1"), the "5 Bananas" currently assigned to "Bag 2."

Optimization engine 306 may also determine that the currently associated bag, "Bag 2," to the selected order line, "5 Bananas," is not associated with any other order line. For example, "Bag 2," from FIG. 4A, is currently assigned to only the second order line. "5 Bananas." If the second order line is re-associated with another bag, then the second bag would become empty. Optimization engine 306 may also determine that re-associating the second order line to the first bag would not violate one or more constraints. As such, optimization engine 306 may re-associate the second order line identifying "5 Bananas" with the first bag. "Bag 1," as indicated in FIG. 4B.

Figure 4C:
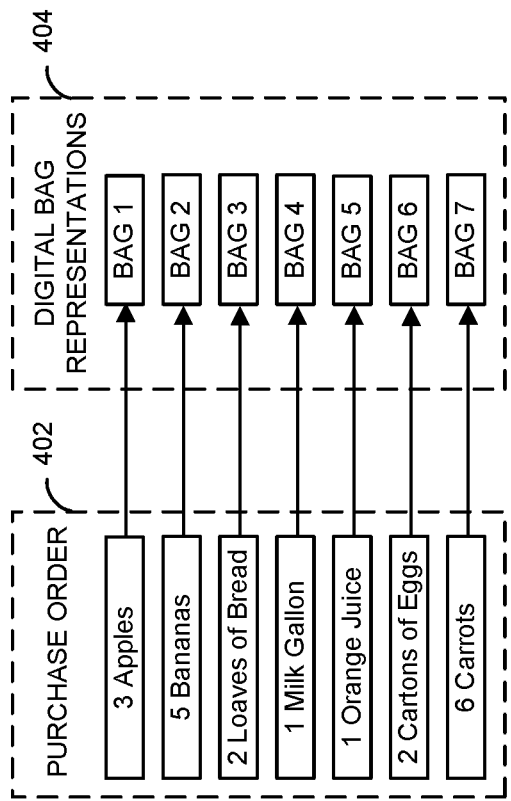

FIG. 4C identifies an example of an update to working assortment data 312, which may also be generated by the optimization engine 306 of FIG. 3 executing one or more additional bag determination optimization iterations. In this example, optimization engine 306 has removed the second bag, "Bag 2," from the digital representation of bags 404. "Bag 2" was removed because it is not associated with any order line in purchase order 402.

In addition, the seventh order line identifying "6 Carrots," previously associated with "Bag 7." has been re-associated with "Bag 6." For example, optimization engine 306 may randomly select the seventh order line, and the sixth bag. Optimization engine 306 may determine that "Bag 6" can hold, in addition to "2 Cartons of Eggs," the "6 Carrots" currently assigned to "Bag 7." In some examples, optimization engine 306 may determine that "Bag 6" cannot hold the "6 Carrots" because of a constraint violation. For example, optimization engine 306 may determine that the "2 Cartons of Eggs" are fragile and should not be placed in the same bag with other items. Optimization engine 306 may also determine that the currently associated bag, "Bag 7," to the selected order line. "6 Carrots." is not associated with any other order line. As such, optimization engine 306 may re-associate the seventh order line identifying "6 Carrots" with the sixth bag, "Bag 6," as indicated in FIG. 4C.

Figure 4D:
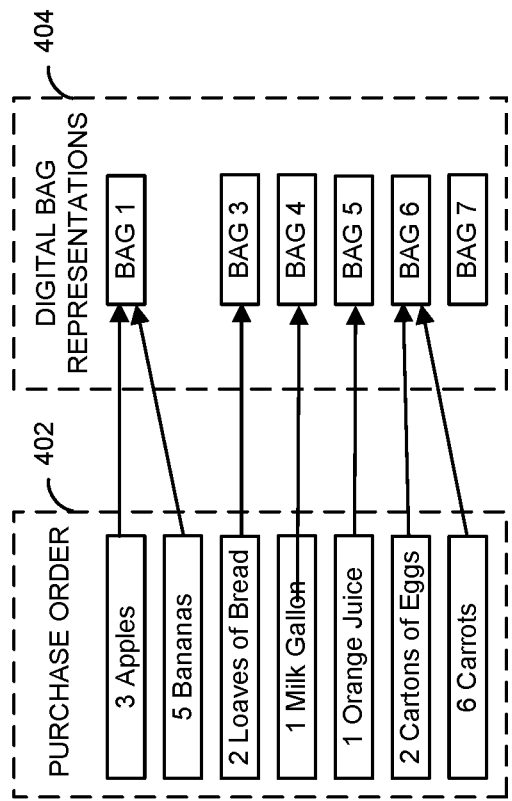

FIG. 4D shows an example of final assortment data 314 as described above with respect to FIG. 3. In this example, the seventh bag, "Bag 7," has been removed from the digital representation of bags 404 because it is not assigned to any order line of purchase order 402. As such, the final assortment data 314 in this example associates the first and second order lines with the first bag. The final assortment data 314 also associates the third order line with the third bag, the fourth order line with the fourth bag, and the fifth bag with the fifth bag. The sixth and seventh order lines are associated with the sixth bag. The second and seventh bag have been removed.

As such, a retailer receiving the final assortment data 314 of FIG. 4B may bag the items associated with purchase order 402 accordingly. For example, the "3 Apples" and "5 Bananas" associated with the first and second order lines would be placed in one bag. The "2 Loaves of Bread," "1 Milk Gallon," and "1 Orange Juice" associated with the third, fourth, and fifth order lines, respectively, would all be placed in individual bags. Finally, the "2 Cartons of Eggs" and "6 Carrots" associated with the sixth and seventh order lines, respectively, would be placed together in one bag.

Figure 5:
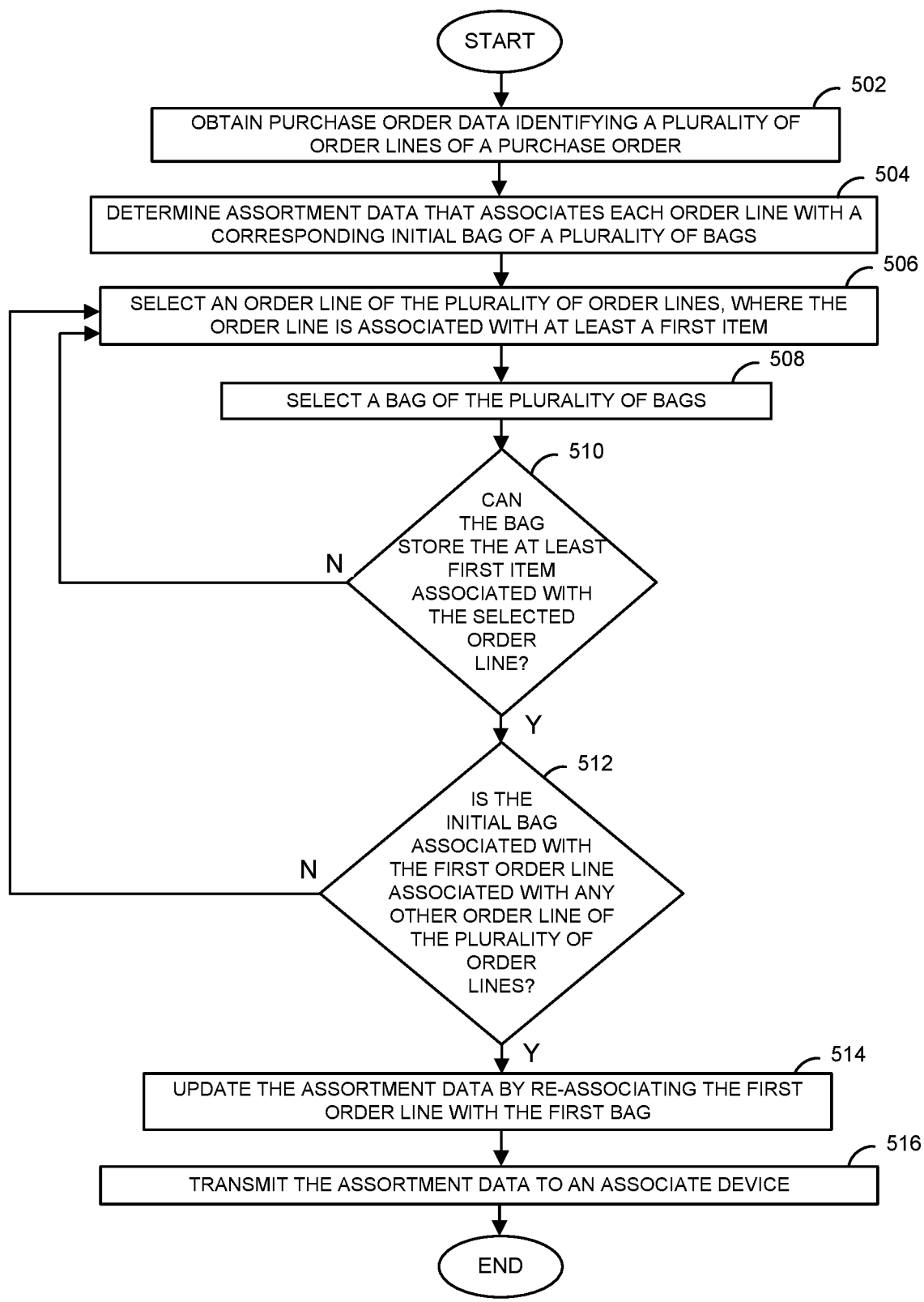
FIG. 5 illustrates a flow diagram of a method for estimating a number of bags to be used for a purchase order using the bag determination system shown in FIG. 1, in accordance with some embodiments of the present disclosure.

FIG. 5 illustrates a flow diagram of a method 600 for estimating a number of bags to be used for a purchase order that may be carried out, for example, by the bag determination system 100 shown in FIG. 1. At step 502, purchase order data identifying a plurality of order lines of a purchase order is obtained. At step 504, assortment data is determined (e.g., generated) that associates each order line of the purchase order with a digital representation of a corresponding initial bag of a plurality of bags. At step 506, an order line is selected, where the selected order line is associated with at least a first item. For example, the order line may be one that is randomly selected from the plurality of order lines for the purchase order. At step 508, a bag of the digital representations of the plurality of bags is selected. For example, the bag may be randomly selected.

Proceeding to step 510, a determination is made as to whether the selected bag can store the item(s) associated with the selected order line. For example, the determination may be based on one or more constraints described herein. If it is determined that the selected bag can store the item(s), the method proceeds to step 512. Otherwise, the method proceeds back to step 506, where another order line is selected (e.g., randomly selected).

At step 512, a determination is made as to whether the initial bag associated with the first order line is associated with any other order line of the plurality of order lines. If it is determined that the initial bag is associated with another order line, the method proceeds back to step 506. Otherwise, the method proceeds to step 514, where the assortment data is updated by re-associating the first order line of the plurality of order lines with the selected first bag. At step 516, the updated assortment data is transmitted to an associate computing device, such as associate computing device 106. A retailer may then sort the items associated with the purchase order according to the received assortment data.

Figure 6:
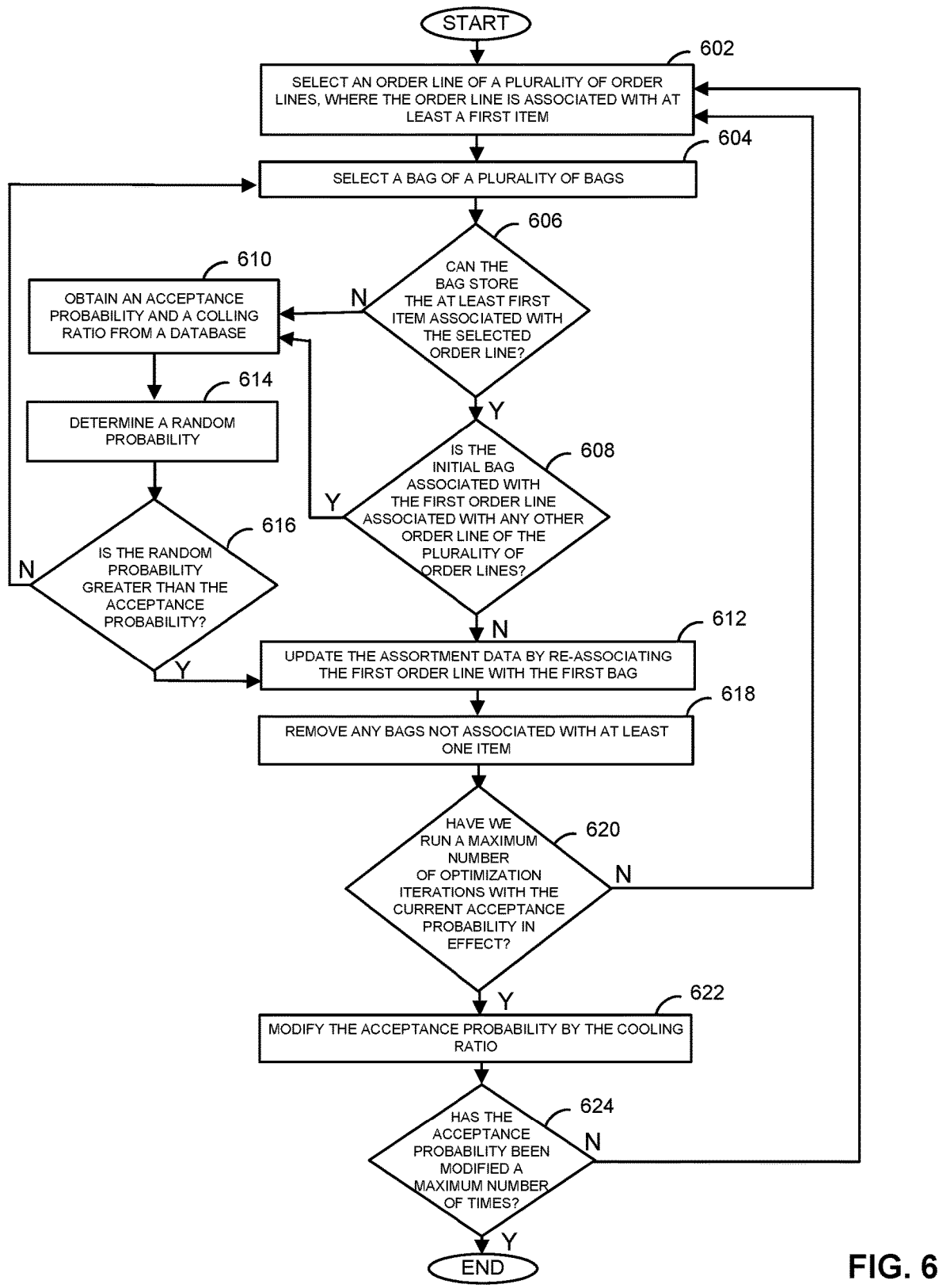
FIG. 6 illustrates yet another flow diagram of a method for estimating a number of bags to be used for a purchase order using the bag determination system shown in FIG. 1, in accordance with some embodiments of the present disclosure.

FIG. 6 illustrates a flow diagram of another method 700 for estimating a number of bags to be used for a purchase order that may be carried out, for example, by the bag determination system 100 shown in FIG. 1. Beginning at step 602, an order line identified by purchase order data is selected, where the selected order line is associated with at least a first item. For example, the order line may be one that is randomly selected from a plurality of order lines for the purchase order. At step 604, a bag of a digital representations of a plurality of bags is selected. For example, the bag may be randomly selected from among the plurality of bags. At step 606, a determination is made as to whether the selected bag can store the item(s) associated with the selected order line. For example, the determination may be based on one or more constraints described herein. If it is determined that the selected bag can store the item(s), the method proceeds to step 608. Otherwise, the method proceeds to step 610.

At step 608, a determination is made as to whether the initial bag associated with the first order line is associated with any other order line of the plurality of order lines. If it is determined that the initial bag is associated with another order line, the method proceeds to step 610. Otherwise, the method proceeds to step 612, where the assortment data is updated by re-associating the first order line of the plurality of order lines with the selected first bag.

At step 610, an acceptance probability and a cooling ratio are obtained from a database, such as database 116 of FIG. 1. Proceeding to step 614, a random probability is determined. For example, a random probability may be determined based on a random number generated by random number generator 308 of FIG. 3. At step 616, a determination is made as to whether the random probability is greater than the acceptance probability. If the random probability is greater than the acceptance probability, the method proceeds back to step 602, where another order line is selected. Otherwise, if the random probability is not greater than the acceptance probability, the method proceeds to step 612, where the assortment data is updated by re-associating the first order line of the plurality of order lines with the selected first bag.

From step 612 the method proceeds to step 618, where any bags not associated with at least one item are removed. For example, any bags that are not associated with an order line of the purchase order are removed, preventing the bag from being available for other items associated with other order lines. Proceeding to step 620, a determination is made as to whether a maximum number of bag determination optimization iterations have been executed with the current acceptance probability in effect. If the maximum number of bag determination optimization iterations have not been executed with the current probability in effect, the method proceeds back to step 602 to perform another bag determination optimization iteration (e.g., steps 602-618). Otherwise, if a maximum number of bag determination optimization iterations have been executed, the method proceeds to step 622. At step 622, the acceptance probability is modified by the cooling ratio. For example, the acceptance probability may be multiplied by the cooling ratio to determine an updated acceptance probability. The updated acceptance probability may be less than the initial acceptance probability. At step 624, a determination is made as to whether the acceptance probability has been modified a maximum number of times. If the acceptance probability has not been modified a maximum number of times, the method proceeds back to step 602, where another bag determination optimization iteration may begin using the updated acceptance probability. Otherwise, if the acceptance probability has been modified a maximum number of times, the method ends.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. The computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. An apparatus comprising:
a communications interface; and
a computing device coupled to the communications interface, the computing device configured to:
obtain, via the communications interface, purchase order data identifying a plurality of order lines of a purchase order, wherein each order line is associated with at least one item;
determine assortment data that associates each order line of the plurality of order lines with a corresponding initial container of a plurality of containers;
store the assortment data within a database;
execute at least a first container optimization determination iteration of a plurality of container optimization determination iterations comprising:
obtaining, from a random number generator, a first random number;
selecting a first order line of the plurality of order lines based on the first random number, wherein the first order line is associated with at least a first item;
obtaining, from the random number generator, a second random number;
selecting a first container of the plurality of containers based on the second random number;
determining whether the first container of the plurality of containers can store the at least first item associated with the first order line of the plurality of order lines based on a volume of the first container and a volume of the at least first item; and
determining whether the corresponding initial container associated with the first order line of the plurality of order lines is associated with any other order line of the plurality of order lines;
update the assortment data within the database by re-associating the first order line of the plurality of order lines with the first container if it is determined that the first container of the plurality of containers can store the at least first item and that the corresponding initial container associated with the first order line of the plurality of order lines is not associated with any other order line of the plurality of order lines; and
transmit, via the communications interface, the assortment data to an associate device.

2. The apparatus of claim 1 wherein, if it is determined that the first container of the plurality of containers cannot store the at least first item, or that the corresponding initial container associated with the first order line of the plurality of order lines is associated with any other order line of the plurality of order lines, the computing device is further configured to:
obtain an acceptance probability from a database;
determine a first random probability;
determine whether the acceptance probability is beyond the first random probability; and
update the assortment data by re-associating the first order line of the plurality of order lines with the first container if it is determined that the acceptance probability is beyond the first random probability.

3. The apparatus of claim 2 wherein the computing device is further configured to:
obtain cooling ratio data; and
adjust the acceptance probability by the obtained ratio data.

4. The apparatus of claim 3 wherein the computing device is further configured to:
execute at least a second container optimization determination iteration of the plurality of container optimization determination iterations comprising:
selecting a second order line of the plurality of order lines, wherein the second order line is associated with at least a second item;
selecting a second container of the plurality of containers;
determining whether the second container of the plurality of containers can store the at least second item associated with the second order line of the plurality of order lines; and
determining whether the corresponding initial container associated with the second order line of the plurality of order lines is associated with any other order line of the plurality of order lines;
determine a second random probability;
determine whether the adjusted acceptance probability is beyond the second random probability; and
update the assortment data by re-associating the second order line of the plurality of order lines with the second container if it is determined that the adjusted acceptance probability is beyond the second random probability.

5. The apparatus of claim 1 wherein the computing device is further configured to determine an order container cost for the purchase order based on the assortment data.

6. The apparatus of claim 1 wherein the computing device is further configured to adjust the assortment data by removing, from the plurality of containers, the corresponding initial container associated with the first order line of the plurality of order lines if it is determined that the corresponding initial container is not associated with any other order line of the plurality of order lines.

7. The apparatus of claim 1 wherein the computing device is configured to:

determine whether the at least one item associated with each order line of the plurality of order lines can be stored in the corresponding initial container; and if the at least one item associated with each order line of the plurality of order lines cannot be stored in the corresponding initial container, determine the assortment data to:

associate at least a first portion of the order line with the corresponding initial container; and associate at least a second portion of the order line with another initial container of the plurality of containers.

8. The apparatus of claim 1 wherein determining whether the first container of the plurality of containers can store the at least first item associated with the first order line of the plurality of order lines comprises at least one of:

a volume determination comprising:
determining a container volume of the first container and an item volume of the at least first item;
determining if the item volume is greater than the container volume; and
determining that the first container cannot store the at least first item if the item volume is greater than the container volume; and a weight determination comprising:
determining a holding weight of the first container and an item weight of the at least first item;
determining if the item weight is greater than the holding weight of the first container; and
determining that the first container cannot store the at least first item if the item weight is greater than the holding weight of the first container.

9. The apparatus of claim 1, wherein the computing device is further configured to obtain the volume of the first container and the volume of the at least first item from the database.

10. A method comprising:
obtaining purchase order data identifying a plurality of order lines of a purchase order, wherein each order line is associated with at least one item;
determining assortment data that associates each order line of the plurality of order lines with a corresponding initial container of a plurality of containers;
storing the assortment data within a database;
executing at least a first container optimization determination iteration of a plurality of container determination iterations comprising:
obtaining, from a random number generator, a first random number;
selecting a first order line of the plurality of order lines based on the first random number, wherein the first order line is associated with at least a first item;
obtaining, from the random number generator, a second random number;
selecting a first container of the plurality of containers based on the second random number;
determining whether the first container of the plurality of containers can store the at least first item associated with the first order line of the plurality of order lines based on a volume of the first container and a volume of the at least first item; and
determining whether the corresponding initial container associated with the first order line of the plurality of order lines is associated with any other order line of the plurality of order lines;
updating the assortment data within the database by re-associating the first order line of the plurality of order lines with the first container if it is determined that the first container of the plurality of containers can store the at least first item and that the corresponding initial container associated with the first order line of the plurality of order lines is not associated with any other order line of the plurality of order lines; and
transmitting the assortment data to an associate device.

11. The method of claim 10 wherein, if it is determined that the first container of the plurality of containers cannot store the at least first item, or that the corresponding initial container associated with the first order line of the plurality of order lines is associated with any other order line of the plurality of order lines, the method further comprises:
obtaining an acceptance probability from a database;
determining a first random probability;
determining whether the acceptance probability is beyond the first random probability; and
updating the assortment data by re-associating the first order line of the plurality of order lines with the first container if it is determined that the acceptance probability is beyond the first random probability.

12. The method of claim 11 further comprising:
obtaining cooling ratio data; and
adjusting the acceptance probability by the obtained ratio data.

13. The method of claim 12 further comprising:
executing at least a second container optimization determination iteration of the plurality of container determination iterations comprising:
selecting a second order line of the plurality of order lines, wherein the second order line is associated with at least a second item;
selecting a second container of the plurality of containers;
determining whether the second container of the plurality of containers can store the at least second item associated with the second order line of the plurality of order lines; and
determining whether the corresponding initial container associated with the second order line of the plurality of order lines is associated with any other order line of the plurality of order lines;
determining a second random probability;
determining whether the adjusted acceptance probability is beyond the second random probability; and
updating the assortment data by re-associating the second order line of the plurality of order lines with the second container if it is determined that the adjusted acceptance probability is beyond the second random probability.

14. The method of claim 10 further comprising determining an order container cost for the purchase order based on the assortment data.

15. The method of claim 10 further comprising adjusting the assortment data by removing, from the plurality of containers, the corresponding initial container associated with the first order line of the plurality of order lines if it is determined that the corresponding initial container is not associated with any other order line of the plurality of order lines.

16. The method of claim 1, further comprising obtaining the volume of the first container and the volume of the at least first item from the database.

17. A non-transitory computer readable medium having instructions stored thereon, wherein the instructions, when executed by at least one processor, cause a device to perform operations comprising:

obtaining purchase order data identifying a plurality of order lines of a purchase order, wherein each order line is associated with at least one item;

determining assortment data that associates each order line of the plurality of order lines with a corresponding initial container of a plurality of containers;

storing the assortment data within a database;

executing at least a first container optimization determination iteration of a plurality of container determination iterations comprising:

obtaining, from a random number generator, a first random number;

selecting a first order line of the plurality of order lines based on the first random number, wherein the first order line is associated with at least a first item;

obtaining, from the random number generator, a second random number;

selecting a first container of the plurality of containers based on the second random number;

determining whether the first container of the plurality of containers can store the at least first item associated with the first order line of the plurality of order lines based on a volume of the first container and a volume of the at least first item; and determining whether the corresponding initial container associated with the first order line of the plurality of order lines is associated with any other order line of the plurality of order lines;

updating the assortment data within the database by re-associating the first order line of the plurality of order lines with the first container if it is determined that the first container of the plurality of containers can store the at least first item and that the corresponding initial container associated with the first order line of the plurality of order lines is not associated with any other order line of the plurality of order lines; and transmitting the assortment data to an associate device.

18. The non-transitory computer readable medium of claim 17 further comprising instructions stored thereon that, when executed by the at least one processor, further cause the device to perform operations comprising:

determining at least one of that:

the first container of the plurality of containers cannot store the at least first item; and the corresponding initial container associated with the first order line of the plurality of order lines is associated with any other order line of the plurality of order lines;

obtaining an acceptance probability from a database;

determining a first random probability;

determining whether the acceptance probability is beyond the first random probability; and updating the assortment data by re-associating the first order line of the plurality of order lines with the first container if it is determined that the acceptance probability is beyond the first random probability.

19. The non-transitory computer readable medium of claim 18 further comprising instructions stored thereon that, when executed by the at least one processor, further cause the device to perform operations comprising:

obtaining cooling ratio data; and adjusting the acceptance probability by the obtained ratio data.

20. The non-transitory computer readable medium of claim 19 further comprising instructions stored thereon that, when executed by the at least one processor, further cause the device to perform operations comprising:

executing at least a second container optimization determination iteration of the plurality of container determination iterations comprising:

selecting a second order line of the plurality of order lines, wherein the second order line is associated with at least a second item;

selecting a second container of the plurality of containers;

determining whether the second container of the plurality of containers can store the at least second item associated with the second order line of the plurality of order lines; and determining whether the corresponding initial container associated with the second order line of the plurality of order lines is associated with any other order line of the plurality of order lines;

determining a second random probability;

determining whether the adjusted acceptance probability is beyond the second random probability; and updating the assortment data by re-associating the second order line of the plurality of order lines with the second container if it is determined that the adjusted acceptance probability is beyond the second random probability.

\* \* \* \* \*